US011258249B2

United States Patent
Schweitzer, III et al.

(10) Patent No.: US 11,258,249 B2
(45) Date of Patent: Feb. 22, 2022

(54) PRIMARY AND SYSTEM PROTECTION FOR AN ELECTRIC POWER DELIVERY SYSTEM

(71) Applicant: Schweitzer Engineering Laboratories, Inc., Pullman, WA (US)

(72) Inventors: Edmund O. Schweitzer, III, Pullman, WA (US); David E. Whitehead, Pullman, WA (US); Tony J. Lee, Henderson, NV (US); Krishnanjan Gubba Ravikumar, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/034,142

(22) Filed: Sep. 28, 2020

(65) Prior Publication Data
US 2021/0111555 A1    Apr. 15, 2021

Related U.S. Application Data

(60) Provisional application No. 62/914,451, filed on Oct. 12, 2019.

(51) Int. Cl.
| | | |
|---|---|---|
| H02J 13/00 | (2006.01) | |
| H02H 7/22 | (2006.01) | |
| H02H 3/027 | (2006.01) | |
| H02H 1/00 | (2006.01) | |
| H02H 3/04 | (2006.01) | |

(52) U.S. Cl.
CPC ............ *H02H 7/22* (2013.01); *H02H 1/0092* (2013.01); *H02H 3/027* (2013.01); *H02J 13/00004* (2020.01); *H02J 13/0004* (2020.01); *H02H 3/04* (2013.01)

(58) Field of Classification Search
CPC ........... H02J 13/00004; H02J 13/00036; H02J 13/0004; H02H 3/04; H02H 7/22; H02H 1/0092; H02H 3/027
See application file for complete search history.

(56) References Cited

U.S. PATENT DOCUMENTS

| | | | | |
|---|---|---|---|---|
| 5,793,750 | A | * | 8/1998 | Schweitzer, III . H02J 13/00016 370/242 |
| 6,058,353 | A | * | 5/2000 | Goodpaster .............. H02H 7/30 702/58 |

(Continued)

OTHER PUBLICATIONS

PCT/US2020/053742 International Search Report and Written Opinion of the International Searching Authority dated Jan. 27, 2021.

(Continued)

*Primary Examiner* — Harry R Behm
(74) *Attorney, Agent, or Firm* — Richard M. Edge

(57) ABSTRACT

Primary protection relays and an integrator disclosed for providing primary protection and secondary applications for an electric power delivery system. The primary protection relays obtain signals from, and provide primary protection operations for the power system, and may operate independently from the integrator. An integrator receives signals and status communications from the primary protection relays to perform secondary applications for the electric power delivery system. The secondary applications may include backup protection, system protection, interconnected protection, and automation functions.

11 Claims, 8 Drawing Sheets

(56) References Cited

U.S. PATENT DOCUMENTS

| | | | |
|---|---|---|---|
| 6,396,279 B1 | 5/2002 | Gruenert | |
| 6,608,493 B2 | 8/2003 | Hensler | |
| 6,795,789 B2 | 9/2004 | Vandiver | |
| 6,847,297 B2 | 1/2005 | Lavoie | |
| 6,892,115 B2 | 5/2005 | Berkcan | |
| 6,892,145 B2 | 5/2005 | Topka | |
| 6,909,942 B2 | 6/2005 | Andarawis | |
| 6,985,784 B2 | 1/2006 | Vandevanter | |
| 6,999,291 B2 | 2/2006 | Andarawis | |
| 7,012,421 B2 | 3/2006 | Lavoie | |
| 7,043,340 B2 | 5/2006 | Papallo | |
| 7,058,481 B2 | 6/2006 | Jiang | |
| 7,058,482 B2 | 6/2006 | Fletcher | |
| 7,068,483 B2 | 6/2006 | Papallo | |
| 7,068,612 B2 | 6/2006 | Berkcan | |
| 7,111,195 B2 | 9/2006 | Berkcan | |
| 7,117,105 B2 | 10/2006 | Premerlani | |
| 7,151,329 B2 | 12/2006 | Andarawis | |
| 7,254,001 B2 | 8/2007 | Papallo | |
| 7,259,565 B2 | 8/2007 | Diercks | |
| 7,262,943 B2 | 8/2007 | Stellato | |
| 7,301,738 B2 | 11/2007 | Pearlman | |
| 7,460,590 B2 | 12/2008 | Lee | |
| 7,532,955 B2 | 5/2009 | Dougherty | |
| 7,636,616 B2 | 12/2009 | Fletcher | |
| 7,693,607 B2 | 4/2010 | Kasztenny | |
| 7,747,354 B2 | 6/2010 | Papallo | |
| 7,747,356 B2 | 6/2010 | Andarawis | |
| 7,986,503 B2 | 7/2011 | Papallo | |
| 8,024,494 B2 | 10/2011 | Soed | |
| 8,213,144 B2 | 7/2012 | Papallo | |
| 8,560,255 B2 | 10/2013 | Elwarry | |
| 8,891,963 B2 | 11/2014 | Patel | |
| 9,366,711 B2 | 6/2016 | Klapper | |
| 9,632,147 B2 | 4/2017 | Hensler | |
| 9,819,611 B2 | 11/2017 | Snowdon | |
| 10,178,047 B2 | 1/2019 | Chapman | |
| 10,379,991 B2 | 8/2019 | Tang | |
| 2003/0007514 A1* | 1/2003 | Lee | H02H 1/0061 370/477 |
| 2003/0048508 A1 | 3/2003 | Yu | |
| 2004/0057178 A1* | 3/2004 | Kase | H02H 3/081 361/85 |
| 2007/0067132 A1* | 3/2007 | Tziouvaras | H02H 7/261 702/122 |
| 2008/0071482 A1* | 3/2008 | Zweigle | G01R 19/2513 702/62 |
| 2009/0012728 A1 | 1/2009 | Spanier | |
| 2009/0254655 A1* | 10/2009 | Kidwell | H04L 41/06 709/224 |
| 2009/0296583 A1 | 12/2009 | Dolezilek | |
| 2010/0040068 A1 | 2/2010 | Wimmer | |
| 2010/0183298 A1 | 7/2010 | Biegert | |
| 2011/0035076 A1* | 2/2011 | Schweitzer, III | H02J 3/06 700/296 |
| 2011/0234199 A1 | 9/2011 | Baert | |
| 2013/0241676 A1* | 9/2013 | Newase | H01H 71/2472 335/18 |
| 2014/0039699 A1* | 2/2014 | Forbes, Jr. | G05B 15/02 700/286 |
| 2015/0270714 A1 | 9/2015 | Talluri et al. | |
| 2015/0281335 A1* | 10/2015 | Heine | H04L 12/42 709/204 |
| 2015/0318739 A1* | 11/2015 | Oda | H02J 13/00034 700/292 |
| 2015/0378408 A1 | 12/2015 | Kaplan | |
| 2016/0013632 A1 | 1/2016 | Lloyd | |
| 2017/0026291 A1 | 1/2017 | Smith | |
| 2017/0250043 A1 | 8/2017 | Hurwitz | |
| 2017/0288950 A1 | 10/2017 | Manson | |
| 2018/0034689 A1 | 2/2018 | Kanabar | |
| 2018/0089057 A1 | 3/2018 | Yang | |
| 2018/0323611 A1 | 11/2018 | Gubba Ravikumar | |
| 2018/0348267 A1 | 12/2018 | Yang | |
| 2019/0081476 A1* | 3/2019 | Konya | H02J 13/0006 |
| 2019/0237997 A1* | 8/2019 | Tsujii | H02J 3/24 |

OTHER PUBLICATIONS

David Costello: Understanding and Analyzing Event Report Information, Oct. 2000.

Joe Perez: A Guide to Digital Fault Recording Event Analysis, 2010.

Considerations for Use of Disturbance Recorders; a Report to the System Protection Subcommittee of the Power System Relaying Committee of the IEEE Power Engineering Society, Dec. 27, 2006.

David Costello: Event Analysis Tutorial, Part 1: Problem Statements 2011.

Jane Starck, Antti Hakala-Ranta, Martin Stefanka, Switchgear Optimization Using IEC 61850-9-2 and Non-Conventional Measurements May 23, 2012.

Will Allen, Tony Lee: Flexible High-Speed Load Shedding Using a Crosspoint Switch Oct. 2005.

Qiaoyin Yang, Rhett Smith: Improve Protection Communications Network Reliability Through Software-Defined Process Bus, Jan. 2018.

Caitlin Martin, Steven Chase, Thanh-Xuan Nguyen, Dereje Jada Hawaz, Jeff Pope, Casper Labuschagne: Bus Protection Considerations for Various Bus Types; Oct. 2013.

* cited by examiner

PRIMARY AND SYSTEM PROTECTION FOR AN ELECTRIC POWER DELIVERY SYSTEM

RELATED APPLICATION

This application claims the benefit of priority under 35 U.S.C. § 119(e) to U.S. Provisional Patent Application No. 62/914,451, filed on Oct. 12, 2019, and entitled "Primary and System Protection for an Electric Power Delivery System," the contents of which are hereby incorporated by reference.

TECHNICAL FIELD

This disclosure relates to primary and system protection for an electric power delivery system. More particularly, this disclosure relates to protection of an electric power delivery system using primary protection relays and an integrator for secondary applications.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
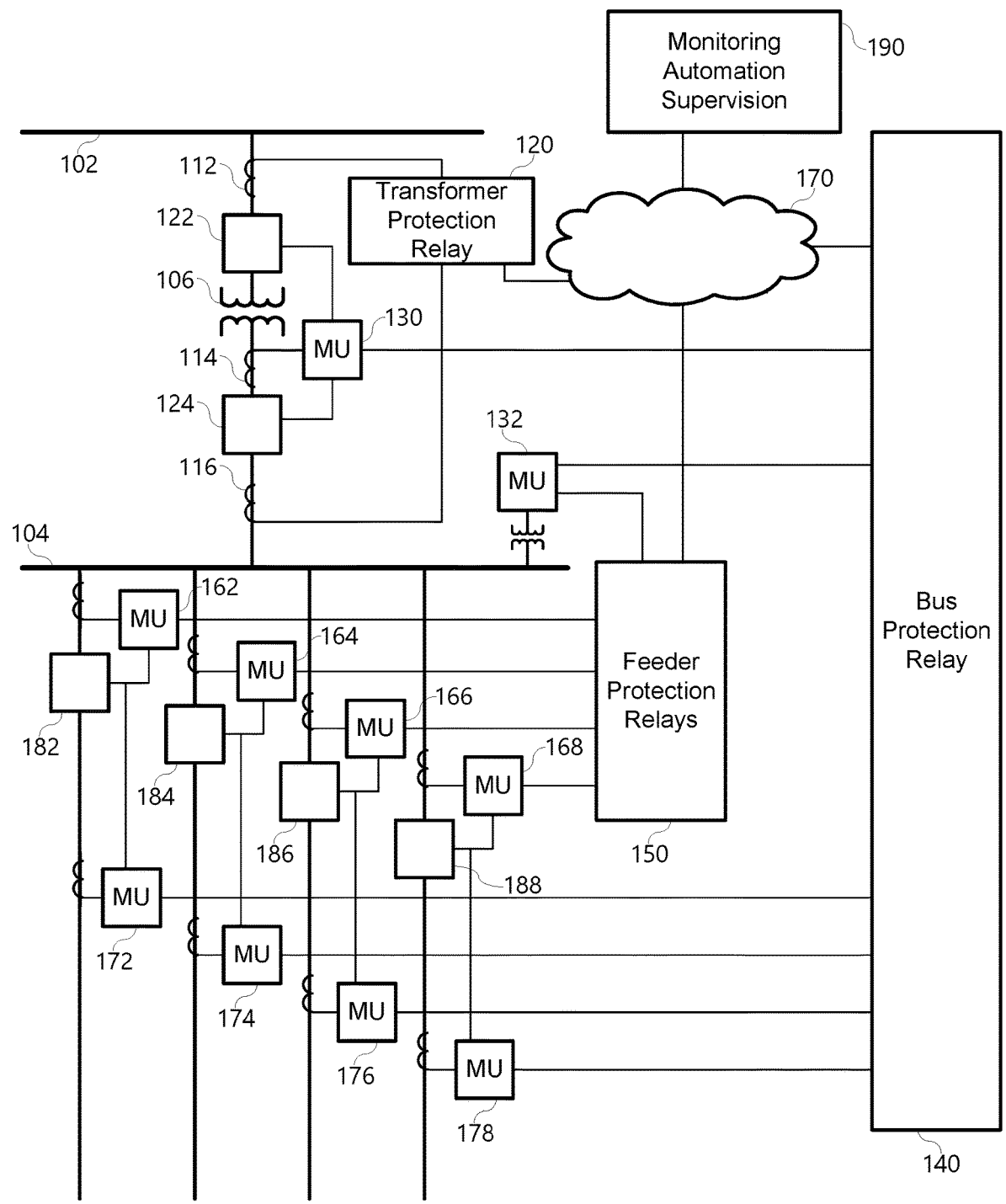
FIG. 1 illustrates a simplified one-line diagram of an electric power delivery system for providing electric power to loads including a system for protection and automation.

Electric power delivery systems are widely used to generate, transmit, and distribute electric power to loads, and serve as an important part of the critical infrastructure. Power systems and components are often monitored and protected by intelligent electronic devices (IEDs) and systems of IEDs that obtain electric power system information from the equipment and provide protective actions, monitor, and automate the power system. Several IEDs may be in communication to facilitate sharing of information for station-wide, area-wide, or even system-wide protection.

Due to the critical nature of electric power systems, it is imperative to monitor and ensure that the equipment is operating within safe parameters even in the event of an anomaly such as a fault or cyber attack. Modern protection systems of IEDs have become increasingly complex and reliant on communications. Further, modern IEDs include hardware and firmware that is ancillary to secure and reliable protection of the power system. Communication systems are often necessary for present-day distributed protection, but often vulnerable to cyber attacks. What is needed is a protection system that provides reliable and secure primary protection and system protection for power systems without reliance on ancillary processes and communication.

Presented herein are several embodiments of systems and methods to provide primary power system protection independent of communication, as well as interconnected protection that is secure and reliable.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. In addition, data being tied or rendered together in a database record may be resident in the same memory device, or across several memory devices, and may be linked together in fields of a record in a database across a network. Embodiments may be provided as a computer program product including a non-transitory computer and/or machine-readable medium having stored thereon instructions that may be used to program a computer (or other electronic device) to perform processes described herein.

FIG. 1 illustrates a simplified one-line diagram of an electric power delivery system. It should be noted that the system may include multiple phases and additional equipment and complexity. Also illustrated is a system of IEDs that obtain electric power system information from merging units (MUs), and effect control actions on the electric power system using MUs to provide protection and automation to the electric power delivery system. The power system includes various equipment such as a bus 102 (illustrated as a transmission bus) providing electric power to a second bus 104 (illustrated as a distribution bus) via a transformer 106 for stepping down the power from a high (transmission) voltage to a lower (distribution) voltage. Various feeders extend from the second bus 104 for delivering electric power to distributed loads. Circuit breakers 122, 124, 182, 184, 186, 188 may be used to selectively connect and disconnect portions of the power system for various purposes such as reconfiguration, protection in the event of a fault, or the like.

A bus protection relay 140 may be an IED configured to determine operating conditions on a zone that includes the second bus 104 and provide signals to effect a protection operation upon determination of an adverse condition. IED 140 may obtain current signals related to electric power entering the bus 104 from MU 130, voltages from bus 104 using MU 132, and current signals related to electric power leaving bus 104 on the feeders from MUs 172, 174, 176, and 178. IED 140 may be configured to provide differential protection, overvoltage protection, and various other protection for zone including the bus 104.

Feeder protection relay 150 may be an IED that obtains bus voltage signals from MU 132 and current signals related to the feeders from MUs 162, 164, 166, and 168. IED 150 may provide overcurrent, directional, distance, overfrequency, underfrequency, and other protection to the feeders.

Transformer protection relay 120 may be an IED configured to provide protection to the transformer 106. IED 120 may obtain current signals from both sides of the transformer 106 from MUs or even directly from CTs 112 and 116. IED 120 may further provide information to IED 140. IED 120 may be configured to provide differential protection overcurrent protection, over frequency protection, underfrequency protection, and other various protection for the transformer 106.

MUs may be in communication with various circuit breakers 122, 124, 182, 184, 186, and 188 to provide signals to the circuit breakers and receive status information from the circuit breakers. Upon receiving an "open" signal from an IED, the MUs may be configured to signal related circuit breakers to open. For example, upon detection of an overcurrent condition on the first feeder, IED 150 may be configured to signal MU 162 to open breaker 182 to remove current from the faulted feeder.

In various embodiments, the IEDs may be in communication with a monitoring, automation, or other supervisory system or device 190, such as a SCADA system. Although common, such a system for protection provides many opportunities for failure and attack. For example, primary protection is undertaken by devices that perform many ancillary functions. If any of the ancillary functions (such as communications) fails, the entire device may become unavailable for protection purposes, leaving equipment unprotected. Furthermore, all of the devices that rely on vulnerable communications may become subject to cyber attack at any point on the communication network.

Figure 2:
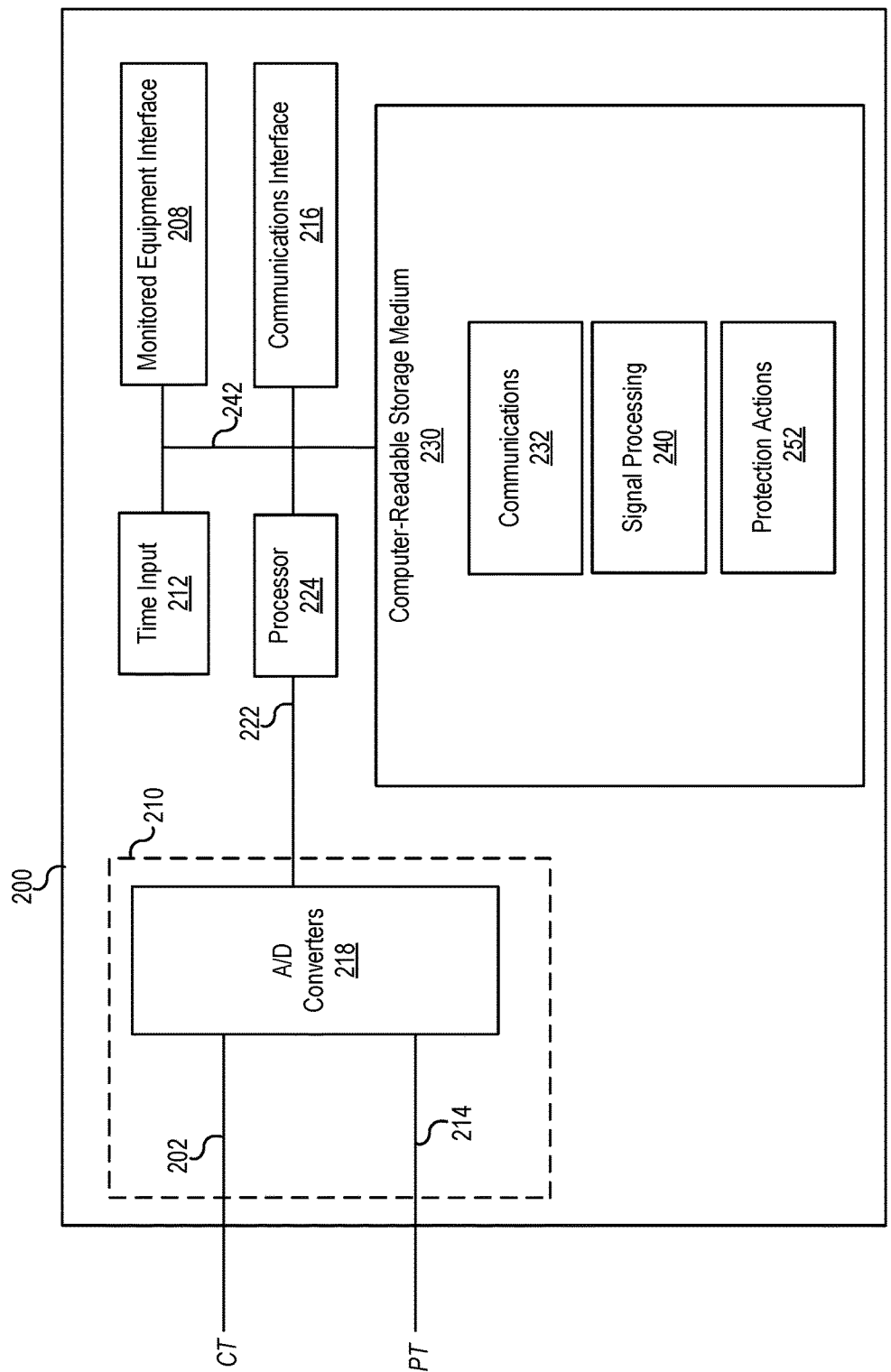
FIG. 2 illustrates a simplified block diagram of a typical intelligent electronic device (IED) used for electric power system protection.

FIG. 2 illustrates a simplified block diagram of an IED 200 such as the transformer relay 120, bus protection relay 140, or feeder protection relay 150. The IED 200 receives power system information such as currents and/or voltages from the power system. As illustrated, the IED 200 obtains analog current and voltage signals from CTs and PTs. In other embodiments, IED 200 may receive digitized analog signals from MUs. IED 200 may include sampling circuitry 210 including current input 202 and voltage input 214. Such inputs 202, 214 may include various transformers, filters, and other hardware to condition the analog signals for sampling and digitizing by one or more analog-to-digital converters A/D 218. The digitized analog signals 222 may be provided to a processor 224.

IED 200 may include various inputs and interfaces such as a time input 212 to obtain a common time signal from a common time source. The common time signal may be used in various protection and monitoring functions. A communications interface 216 may be provided to facilitate communications with SCADA, other IEDs, MUs, or the like. A monitored equipment interface 208 may be in communication with monitored equipment such as circuit breakers, transformers, capacitor banks, voltage regulators, reclosers, MUs, or the like to send command signals to the equipment and/or receive status information from the equipment. A computer readable storage medium 230 may be a repository of computer instructions for execution on the processor 224. Although illustrated as a separate component, the storage medium 230 may be packaged with the processor 224. In various other embodiments, the processor may be embodied as a dedicated processing device such as a field-programmable gate array (FPGA) operating various protection instructions. Various components may be in communication via a communications bus 242.

The computer-readable storage medium 230 may include instructions for execution of various operations of the IED. For example, a module of communications instructions 232 may be executed by the processor such that the IED 200 performs communication functions with other devices. The communications instructions 232 may include instructions for formatting communications, receiving communications, addresses for communicating, settings related to compliance with IEC 61850 communications standards, and the like. Signal processing instructions 240 may include instructions for processing current, voltage, and other signals for use by other protection and monitoring functions. For example, signal processing 240 may include various digital filters, resampling, and the like. Protection actions instructions 252 may include instructions for performing various protection functions such as overcurrent, differential, directional, distance, undervoltage, voltage regulation, bus protection, overfrequency, underfrequency, traveling wave, and other protection operations.

It should be noted that typical IEDs perform many operations in addition to the primary protection operations required for safe and reliable operation of an electric power delivery system. In many installations, IEDs include orders of magnitude more lines of code dedicated to non-primary protection functions than to protection operations. For example, in a system of IEDs in communication under the IEC 61850 standard, each IED includes modules to execute communications and settings related to the communications to receive according with a Configured IED Description (CID) file.

Should such IEDs fall victim to cyberattack or suffer other failure, the primary protective functions of the device may be compromised. For example, if such an IED or system of devices undergoes a cyber attack and is compromised, the attacker could take control of the IED and control primary equipment of the power system. Similarly, if an error occurs in one of the operations of the IED, it may perform a restart, during which time the protective functions of the IED are not operational. As the complexity of the functions (many of which are not directly responsible for protection) increases, the likelihood of error and need for restart also increases. Furthermore, it has been observed that the time for restart also increases as the complexity of the IED increases; thus increasing the time that the IED does not perform protective functions during the restart.

In accordance with several embodiments herein, primary protection operations are physically separated from various other functions performed by IEDs and supervisory systems. Communication between primary protection relays and supervisory devices is not needed for primary protection operations. In various embodiments, the protection system includes primary protection relays in communication with the electric power delivery system to obtain signals therefrom (either directly or using a merging unit) and effect primary protective actions by sending commands to primary equipment (either directly or using a merging unit). Further, the primary protective relays may communicate with various other devices such as integrators, automation systems, monitoring systems, supervisory (SCADA) systems and other IEDs. However, the primary protective relays may continue to provide monitoring and protection functions even if such communications become unavailable. Furthermore, backup protection and interconnected protection is provided by a dedicated integrator that receives simple communications from the primary protection relays.

Figure 3:
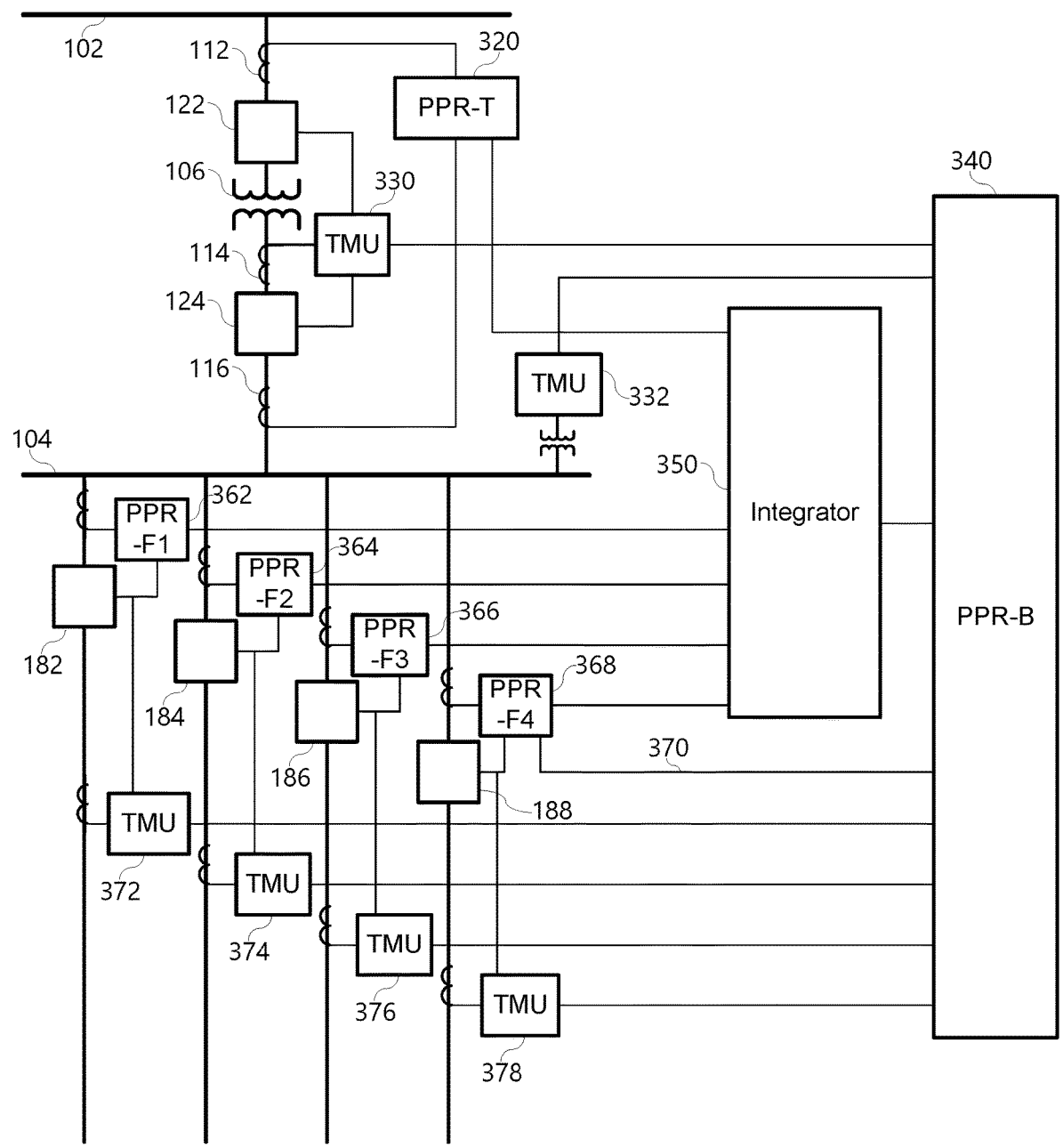
FIG. 3 illustrates a simplified one-line diagram of an electric power delivery system for providing electric power to loads including a backup protection.

FIG. 3 illustrates a simplified one-line diagram of an electric power delivery system such as the system illustrated in FIG. 1, including a protection system in accordance with the present disclosure. In particular, the protection system includes various primary protection relays 320, 340, 362, 364, 366, 368, that do not depend on communication with an automation, monitoring, or supervisory system to continue providing reliable primary protection to the electric power delivery system equipment. Primary protection relays may be configured to continue to provide primary protection functions when communications to other devices (for example, integrators, bus-protection relays, and other primary protection relays) is unavailable. Primary protection relays may further be configured to continue to provide primary protection functions during a loss of a communications network. Such primary protection relays may be used to separate primary protection functions from other functions traditionally performed by IEDs.

One or more of the primary protection relays may be a transformer relay 320 for providing protection to transformer 106. The transformer relay 320 may obtain current signals from CT 112 on the high voltage side of the transformer 106 and CT 116 on the low voltage side of the transformer 106. As illustrated, the transformer relay 320 may obtain current signals directly from CTs 112, 116. In various embodiments, the transformer relay 320 may obtain digitized analog signals from merging units in communication with CTs 112, 116 such as, for example, TMU 330. In certain embodiments, the transformer relay 320 may also obtain voltage signals from the high voltage and/or low voltage sides of the transformer 106 using PTs or merging units in communication with PTs.

The transformer relay 320 may determine protective actions using the current and/or voltage signals from high and/or low sides of the transformer 106. For example, the transformer relay 320 may determine overcurrent conditions on the high and/or low sides of the transformer 106; time-overcurrent conditions on the high and/or low sides of the transformer 106; current differential conditions through the transformer 106; neutral overcurrent conditions; restricted earth fault conditions; directional power conditions; and the like. In certain embodiments, the transformer relay 320 may obtain temperature inputs from the transformer and determine temperature conditions of the transformer 106. More, different, or fewer protective elements may be performed by the transformer relay 320.

The transformer relay 320 may be in communication with one or more circuit breakers such as breakers 122 and 124. Such communication may be direct communication with the circuit breakers 122, 124 or via a merging unit such as TMU 330. Upon detection of a condition outside of predetermined operating conditions, the transformer relay 320 may send an open or trip command to one or both circuit breakers 122, 124, thus effecting a trip protective action. Accordingly, the transformer relay 320 may provide protective functions to equipment of the electric power system.

Similarly, feeders from bus 104 may be protected using feeder relays 362, 364, 366, 368. Feeder relays 362-368 may obtain current signals from respective feeders using CTs and/or merging units such as TMUs 372, 374, 376, 378. Feeder relays 362-368 may further obtain voltage signals from the bus using a PT and/or a merging unit such as TMU 332. Using the current and/or voltage signals, the feeder relays 362-368 may determine operating conditions on the respective feeders including, for example: phase overcurrent; ground overcurrent; neutral overcurrent; negative sequence overcurrent; arc flash; overvoltage, undervoltage; directional power; overfrequency; underfrequency; rate-of-change-of-frequency; fault direction; fault distance; and the like. In the event of a condition determined outside of predetermined operating conditions, the feeder relay 362-368 may be configured to send an open or trip command to an associated circuit breaker, thus effecting a protective action on the electric power delivery system.

Feeder relays 362-368 may be in communication with respective circuit breakers 182, 184, 186, 188 as illustrated. In various embodiments, the feeder relays 362-368 may be in direct communication with the circuit breakers 182-188 as illustrated. In various other embodiments, the feeder relays 362-368 may be in communication with the circuit breakers 182-188 via merging units such as TMUs 372-378. Accordingly, feeder relays 362-368 may provide protection to the feeders using measurements from the power system, using the measurements in one or more protective elements and effecting a protective action by commanding a circuit breaker to open.

Various other primary protection relays may be used to provide primary protection functions for different equipment of an electric power delivery system. For example, generator relays may be configured to provide primary protection for generators; motor relays may be configured to provide primary protection for motors; and so forth. Generator relays may provide primary protective functions for a generator such as, for example, overvoltage, undervoltage, overcurrent, current differential, frequency protection, stator ground, restricted earth fault, thermal, directional, out-of-step, loss-of-field, breaker failure, field ground, and the like. Motor relays similarly provide primary protective functions for a motor including, for example, undervoltage, overvoltage, loss-of-potential, arc-flash, overcurrent, out-of-step, frequency protection, broken rotor bar, current differential, thermal, and the like.

The protective system may include an integrator 350 in communication with various devices and equipment in the electric power delivery system. The integrator 350 may perform system functions such as monitoring, automation, supervisory, communication, backup protection, interconnected protection, and other functions. As illustrated, the primary protective relays (such as, for example, the transformer relay 320 and the feeder relays 362-368) may be in communication with the integrator 350. According to various embodiments, the primary protective relays may transmit information to the integrator useful for its functions. The primary protective relays may sample electric power system signals and use the samples for primary protection functions. The primary protection relays may transmit the samples to the integrator. The primary protective relays may transmit other communications to the integrator, such as indications of protective actions taken by the primary protective relays upon taking such protective actions. The integrator may receive and resample all streams of electric power system samples (from all connected primary protection relays). The integrator may time align the resampled signals for use in secondary applications. The secondary applications may determine electric power delivery system conditions using information from the primary protective relays, and assert a command based on the determined conditions. That is, if the electric power delivery system conditions are outside of predetermined operating conditions, the secondary applications may determine a control signal and produce a control command for the electric power delivery system. The secondary applications may generally be backup protection, system protection, automation, and the like. One such secondary application is to provide centralized protection functions for a portion of the electric power system. Primary and/or backup protection can be provided using the integrator for several applications including, for example, fast bus/zone interlock scheme for bus protection, breaker failure protection, cable differential protection, and the like. Additional description of the secondary applications performed by the integrator is provided hereafter.

The primary protective relays may communicate calculations such as results of protection operations to the integrator 350. For example, a feeder relay 362 may detect a fault and calculate the magnitude of the fault. The feeder relay 362 may be configured to communicate to the integrator 350 the occurrence of the fault, a time, the distance to the fault, the current, and the protective action that was taken.

Furthermore, the primary protective relays may be configured to communicate to the integrator 350 when thresholds are crossed by power system conditions even if a protective action is not taken. For example, the transformer relay 320 may determine that a temperature of the transformer 106 is elevated above a high threshold, but has not yet reached a trip threshold. In such an instance, the transformer relay 320 may send the temperature information to the integrator 350.

The protection system may also include a primary protection relay in the form of a bus protection relay 340 configured to provide protective functions to the bus 104. Bus protection relay 340 may be a primary protection relay, as it is capable of obtaining power system measurements and providing protective functions without communication with any monitoring or other supervisory system. Bus protection relay 340 may obtain electric power system measurements related to electric power entering and leaving the protected bus 104 using CTs, PTs and the like and/or merging units. As illustrated, bus protection relay 340 obtains current measurement entering bus 104 from merging unit 330 which obtains current signals using CT 114. Voltage measurements may be obtained from merging unit 332 which obtains voltage signals from the bus 104 using a PT. Measurements of current leaving the bus 104 may be obtained from merging units 372, 374, 376, 378, which obtain current signals from the feeders using CTs. The bus protection relay 340 may use the currents and/or voltages to perform various protection functions such as, for example: overcurrent (phase, ground, neutral); breaker failure; time-overcurrent; current differential; undervoltage; overvoltage; and the like. The bus protection relay 340 may be configured to protect a zone of the electric power delivery system such as, for example, between circuit breaker 114 and breakers 182-188. The bus protection relay 340 may be configured to detect an event using the currents and/or voltages, and send a trip command to one or more circuit breakers to remove power from a portion of the power system affected by the event. For example, the bus protection relay 340 may determine that a fault is present on bus 104 using current differential protection principles, and command breaker 124 to open (either via direct communication or via merging unit 330) to remove electric power from the faulted bus 104. The bus protection relay 340 may further command breakers 182-188 to open (either via direct communication or via merging units 372-378) to limit potential backfeed from the feeders into the faulted bus 104.

Similar to the primary protection relays 320 and 362-368, the bus relay is configured to continue providing protective functions to the power system regardless of availability of any integrator, monitoring, automation, or supervisory systems or devices. In various embodiments described herein, the primary protection relays 320, 340, 362-368 may be configured to primarily perform protective functions, with secondary functions being removed to a separate device such as the integrator 350. For example, calculating, time stamping, and time aligning synchrophasors may be unnecessary for protective functions, and thus removed to the integrator. Similarly, many communications functions such as formatting communications to correspond with supervisory protocols may be removed to the integrator.

Some primary protection functions may be performed by a combination of primary protective relays. For this, the system may include some communication between primary protection relays. As illustrated, a dedicated communication pathway 370 is configured between feeder relay 368 and bus relay 340. Although a single communication pathway between one feeder relay and the bus relay is illustrated, several primary protection relays may be in similar communication. The communication may be peer-to-peer, high speed, and operate on optical or electrical media. The communication may operate in accordance with the MirroredBits® protocol available from Schweitzer Engineering Laboratories, Inc. of Pullman, Wash. In certain embodiments, the communication may facilitate primary protection functions such as, for example, transfer trip, blocking, interlocking, permissive schemes, direct control, relay-to-relay communications, or the like. In the illustrated example, the communication 370 may be useful for direct transfer tripping by the bus relay 340 in the event of breaker failure detection by the feeder relay 368. Thus, the bus relay may clear a fault by opening breaker 124 and/or 122 in the event that breaker 188 does not trip.

Figure 4:
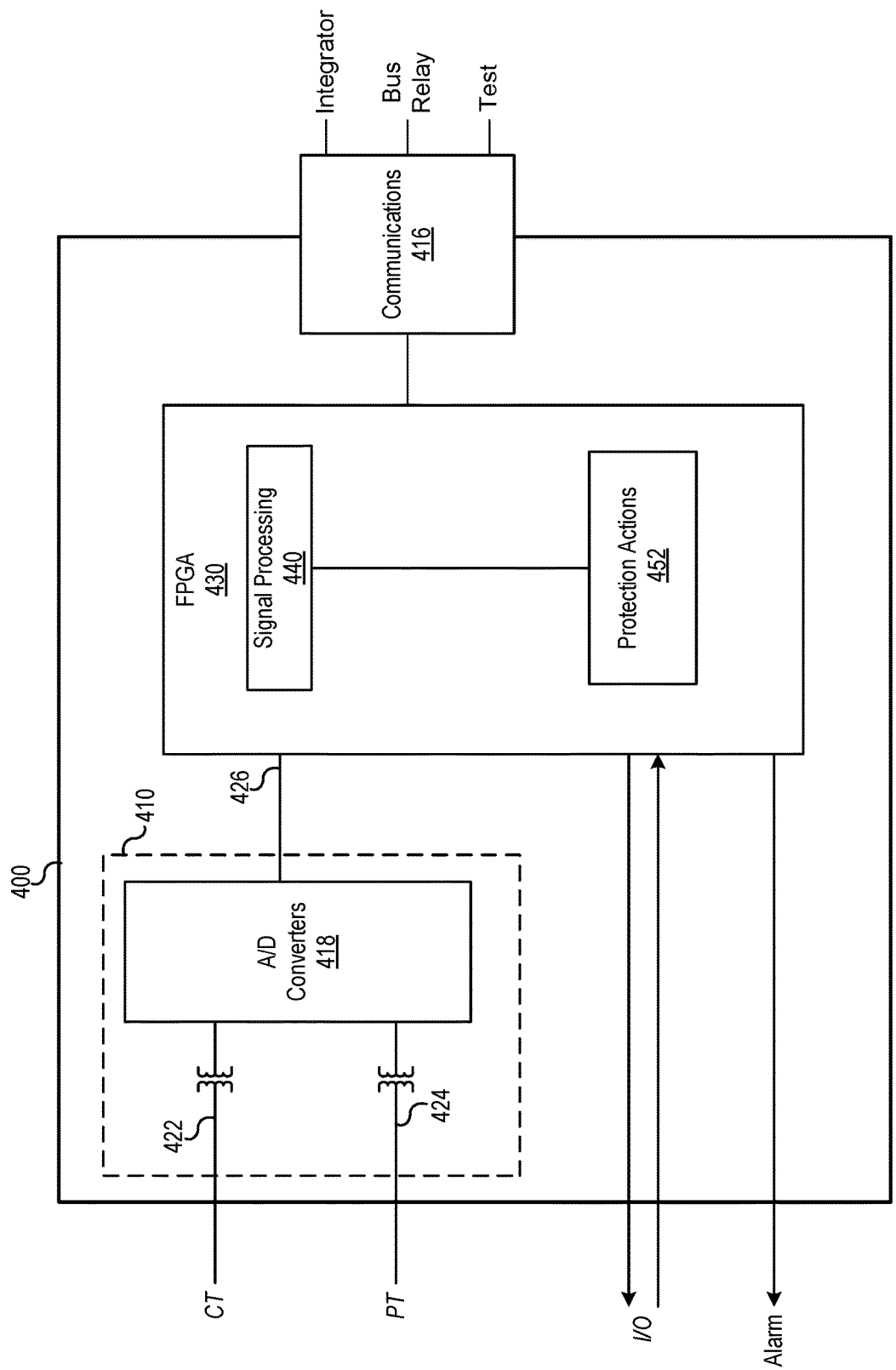
FIG. 4 illustrates a simplified block diagram of a primary protection device for maintaining protection of the electric power delivery system.

FIG. 4 illustrates a simplified block diagram of a primary protective relay 400 in accordance with several embodiments herein. The primary protective relay 400 may be configured as a transformer relay, bus relay, feeder relay, motor relay, generator relay, or the like. The primary protective relay 400 may be configured to perform dedicated protective functions available even without communication with any monitoring, automation, or supervisory system. As illustrated, the primary protective relay 400 may include a signal input 410 for obtaining electric signals from the electric power delivery system either from primary equipment or from MUs. In the illustrated embodiment, current signals 422 may be obtained from an instrument transformer such as a CT; and voltage signals 424 may be obtained from an instrument transformer such as a PT. Various other equipment may be used to obtain currents and/or voltages. The current and voltage signals 422, 424 may be sampled and digitized by one or more analog-to-digital (A/D) converters 418. The signal input may include various other filters and the like to condition the signal for use by the protective functions. Although a single set of current and voltage signals are illustrated, the primary protective relay 400 may be configured to obtain multiple current signals and/or multiple voltage signals.

Furthermore, although the illustrated embodiment includes a primary protective relay 400 configured to obtain current and voltage signals directly using the signal processing 410, in several embodiments digitized current and/or voltage signals may be obtained using a MU. In such embodiments, the primary protective relay 400 may be configured with appropriate communication media for receiving digitized analog signals from one or more MUs. Further still, the primary protective relay 400 may be configured to provide a sample timing signal to the MU(s) to control sample timing.

The primary protective relay 400 may also include input/output for signaling to and receiving information from primary equipment. The input/output may be in direct communication with the primary equipment or may be in communication with a merging unit for transmitting commands to primary equipment and receiving information from primary equipment. For example, the primary equipment may be a circuit breaker or a recloser configured to open and/or close on command and provide a status signal indicating a state of open or closed. In other embodiments, the primary equipment may be a switch, voltage regulator, motor, generator (generator governor, inverter, or the like), capacitor bank, reactor, transformer, or the like, depending on the configuration of the primary protective relay 400.

The primary protective relay 400 may include an alarm output configured to provide an alarm signal upon occurrence of predetermined conditions such as taking a protective action, fault detection, or the like. The alarm signal may be provided as closing a contact output, a visual alarm, an audible alarm, a digital communication, or the like.

The primary protective relay 400 may also include one or more communications ports 416. In some embodiments, the communications ports 416 may be electrical. In various embodiments, the communications ports 416 may be optical to electrically isolate the primary protective relay 400 from the integrator, monitoring, automation, supervisory, or other systems and devices. The communications from communications ports 416 may be synchronous or asynchronous, and used for various predetermined purposes such as, for example, setting the primary protective device 400, communication with monitoring, automation, supervisory or other systems or devices, communication with one or more integrators, communication with one or more primary protection devices, testing, or the like.

The primary protective relay 400 may include a processing unit for executing the functions of the primary protective relay 400. As illustrated, the processing unit may be embodied as a field-programmable gate array (FPGA) 430 including instructions that when executed cause the primary protective relay 400 to perform functions in accordance with the instructions. In various embodiments, the processing unit is embodied as an FPGA; whereas in various other embodiments, the processing unit may be any hardware capable of executing computer instructions such as a microprocessor, application-specific integrated circuit (ASIC), or the like, or even combinations of different varieties of processing units (e.g. portions of instructions executed by a processor and portions of the instructions executed by an FPGA). The functions may include signal processing 440 and protection actions 452. Signal processing 440 may include instructions useful for conditioning the digitized analog signals 426 into useful quantities for protection actions. For example, if the protective function includes an overcurrent element, the signal processing 440 may calculate current magnitudes for the protected phases. Similarly, another protection element may require a negative sequence of the electrical signal, and the signal processing 440 may be configured to calculate the negative sequence of the three-phase signal.

The protective actions 452 may include instructions for the use of the signals from signal processing 440 to perform the selected protective functions. The available protective functions will depend on the settings and the type of primary protective relay 400. For example, if the primary protective relay 400 is a transformer relay, the protective actions 452 may include: overcurrent elements (phase, high side, low side, neutral, ground); time overcurrent; current differential; restricted earth fault; directional power; and so forth. Settings may be applied to the protective actions 452 depending on the specific protected equipment and system. In operation, the FPGA 430 may execute the protective actions 452 using the settings and the obtained electrical signals to determine a condition of the protected primary equipment or power system. Upon detection of predetermined conditions, the FPGA 430 sends a control signal to the protected equipment, such as a trip/open command to a circuit breaker. Furthermore, the FPGA 430 may operate instructions for communicating using port(s) 416 to signal to one or more integrators the power system conditions, actions taken, or the like. Even in the failure or unavailability of the communications 416, however, the primary protective relay 402 may be configured to continue executing the protective actions 452, maintaining protection to the primary equipment and power system.

Thus, according to several embodiments herein, the primary protection relays are configured to receive electric power delivery system signals, determine a status of the electric power delivery system using those signals, and assert a protective action command when the status is outside of a predetermined operating parameter. The primary protection relays may further be configured to transmit the electric power delivery system signals (or a subset thereof) and the status to a supervisory device such as an integrator. The integrator, as set forth in more detail below, may be configured to use the electric power delivery system signals and status information to perform secondary applications. In general, the secondary applications may include determining an electric power delivery system condition and asserting a command based on the electric power delivery system condition.

Figure 5:
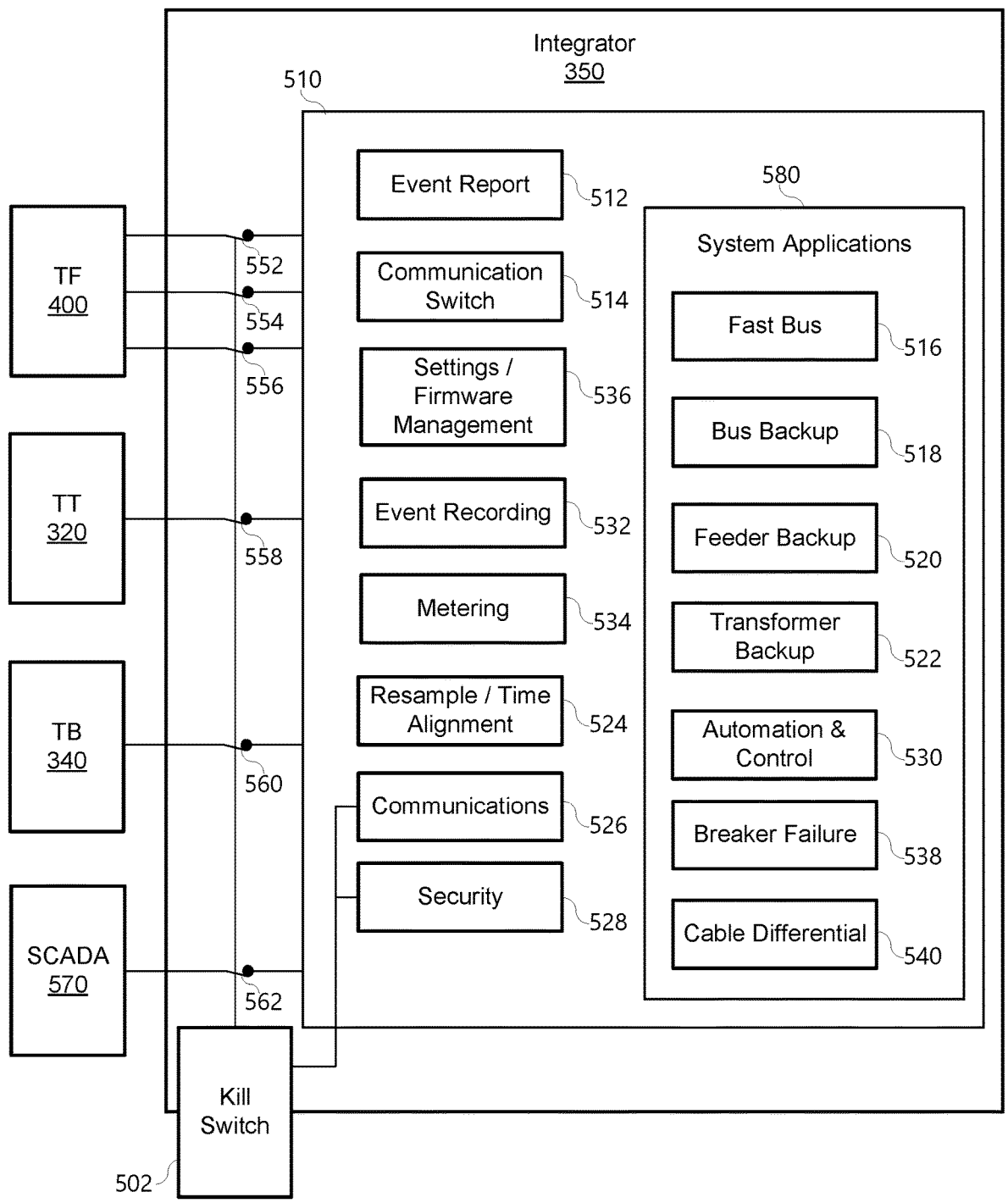
FIG. 5 illustrates a simplified block diagram of an integrator for backup protection and automation of an electric power delivery system.

FIG. 5 illustrates a simplified block diagram of an integrator in accordance with several embodiments of this disclosure. An integrator facilitates the physical separation of protection functions (performed by the primary protective relays) from non-protective functions (performed by the integrator). The function of the integrator is to provide non-primary protective functions such as secondary applications 580, integration with other integrators, as well as communication with monitoring, automation, and supervisory applications. Certain functions previously performed by IEDs protecting electric power systems that are not directly required for primary protection may be removed from the primary protective devices in accordance with the present disclosure, and performed by an integrator 350. Each integrator may be in communication with one or more primary protective devices, one or more other integrators, as well as other monitoring, automation, and supervisory systems.

As discussed above, the primary protective devices are configured to continue to provide protective functions to the electric power delivery system even when the integrator or other monitoring, automation, and/or supervisory systems and devices are unavailable. Thus, protection of the electric power delivery system continues through times of disruption or unavailability of the integrator (e.g. during testing procedures, restart, upgrade, settings changes, hardware malfunction, software error, bit flip errors, physical attack, cyber attack, or the like). The integrator may be configured to stop its communication with primary protective devices in the event of a disruption or period of unavailability of the integrator so that such integrator disruption or unavailability cannot affect the protective functions of the primary protective devices.

As illustrated in FIG. 5, the integrator 350 includes a processing device 510 for executing instructions related to such functions. The processing device 510 may be any processor capable of executing computer instructions including, for example, a computer processor, a microprocessor, an FPGA, or the like, and may be packaged with or be in communication with computer memory for storing computer instructions to be executed by the processing device 510. The various operations that may be stored as computer instructions and when executed by the processing device 510 performed by the integrator include, for example, event reporting 512, communications switching 514, resampling and time alignment 524, communications 526, security 528, and the like, as well as secondary applications 580 that include backup protection and system protection functions. The integrator 350 may include event recording 532 functions where power system conditions, time, and actions taken are recorded for later retrieval, and/or transmission using the event report function 512. The integrator 350 may perform metering operations 534. The integrator may also perform settings and/or firmware management operations 536 such as, maintaining current records of settings and firmware versions for each of the connected primary relays; updating settings on primary relays; updating firmware of primary relays; and the like.

The integrator 350 may be in communication with, and even facilitate communication among several different devices and systems including, for example: one or more feeder protection relays 400 (such as feeder protection relays 362, 364, 366, 368); transformer protection relay 320; bus protection relay 340; motor relay, generator relay; and the like. The integrator 350 may be in communication with other integrator(s), monitoring, automation, or supervisory systems such as, for example, SCADA 570. As suggested above, the integrator 350 may perform communication functions and may function as a communication switch among the various connected devices.

The integrator 350 may include one or more disconnect switches 552, 554, 556, 558, 560, 562 for selectively making and breaking communication paths with the various connected devices. Any configuration of switches capable of selectively breaking the communication pathways to the various device may be used. The switches 552-562 may be in the form of electromagnetic relays capable of rapid disconnection. The switches 552-562 may be optical switches when communication with the devices uses optical media. In any case, the switches 552-562 may be configured to disconnect communication between the various devices and the integrator 350.

The switches 552-562 may be operated by a kill switch 502. When activated, the kill switch 502 may signal the switches to open (e.g. an electrical signal to a relay, an electrical signal to an optical switch, a physical action on physical contacts, or the like), thus disconnecting communications between the integrator and the various devices, including the primary protection relays. The kill switch 502 may be operated by various actions. In one embodiment, the integrator 350 includes a dedicated physical input (pushbutton, membrane button, switch, or the like) that may be activated by a human operator to activate the kill switch 502. Accordingly, an operator may activate the kill switch 502 using the physical input to immediately open the switches, disrupting communications between the integrator 350 and connected devices. The physical input may be situated on a front panel of the integrator 350, near a human-machine interface of the integrator 350, or on other such face of the integrator 350 so as to be accessible by an operator.

As mentioned above, the various primary protection devices and/or merging units in communication with the integrator 350 may provide a stream of samples to the integrator 350. The integrator 350 may operate resampling and time alignment 524 instructions to resample the various streams of samples and time align the resampled values. The primary protection devices may also transmit status messages to the integrator relating to the status of the monitored equipment and/or status of the various operations of the primary protection relays. For example, status of equipment may include open/closed status of breakers or switches, temperature, and the like. Status of protection operations may include indication of when a threshold is crossed, protection commands (e.g. trip), and the like. The resampled and time-aligned samples as well as the status of equipment and status of protection operations may be made available for various secondary applications 580. The secondary applications may include several backup protection applications and centralized protection functions, even while the primary protection relays continue to provide primary protection to the various equipment associated therewith.

Some examples of backup protection functions include bus backup protection 518, feeder backup protection 520, and transformer backup protection 522. The backup protection functions may operate similarly protection applications as the primary protection relays performing similar protection operations. In other embodiments, the backup protection functions may use samples from multiple primary protection relays to perform the backup protection functions. The backup protection may be redundant to the primary protection of the primary protection relays. The backup protection may include a time delay configured to allow the primary protection to operate before the backup protection performs an action.

The integrator 350 may be configured to perform breaker failure 538 protection, in which the integrator 350 determines whether a breaker has operated after a signal has been sent to open the breaker. If the breaker has not opened, the integrator 350 may send a signal to the merging unit and/or to the primary protective relay to attempt to open the breaker. Breaker failure 538 may use the resampled and time-aligned samples and other communications from various primary protection relays to determine that the open signal has been sent and that the breaker has not opened. For example, a primary protection relay in the form of a feeder relay 362 of FIG. 3 may detect an overcurrent condition on the feeder, transmit an open command to breaker 182, and transmit the overcurrent condition and the command to the integrator 350. Indeed, the integrator 350 may signal a second breaker to open, where the second breaker is positioned to also remove power from the effected portion of the electric power delivery system. For example, upon detection of a fault on its feeder, primary feeder protection relay 362 may signal breaker 182 to open (via merging unit 372), and transmit the open signal to the integrator 350. On failure of the breaker to open, the integrator 350 may continue to receive current signals from the primary feeder protection relay 362 and from the primary bus protection relay 340 indicating that an overcurrent condition continues to persist. Furthermore, merging unit 372 may provide a "closed" signal status of the breaker 182 to primary feeder protection relay 362; which signal the primary feeder protection relay 362 sends to the integrator 350. Thus, upon detection of the failure of the breaker 182 to open (using the continued overcurrent signal and/or the "closed" status of breaker 182), the integrator 350 may signal for breaker 122 and/or 124 to open, removing power from the bus 104 and related feeders.

Figure 6:
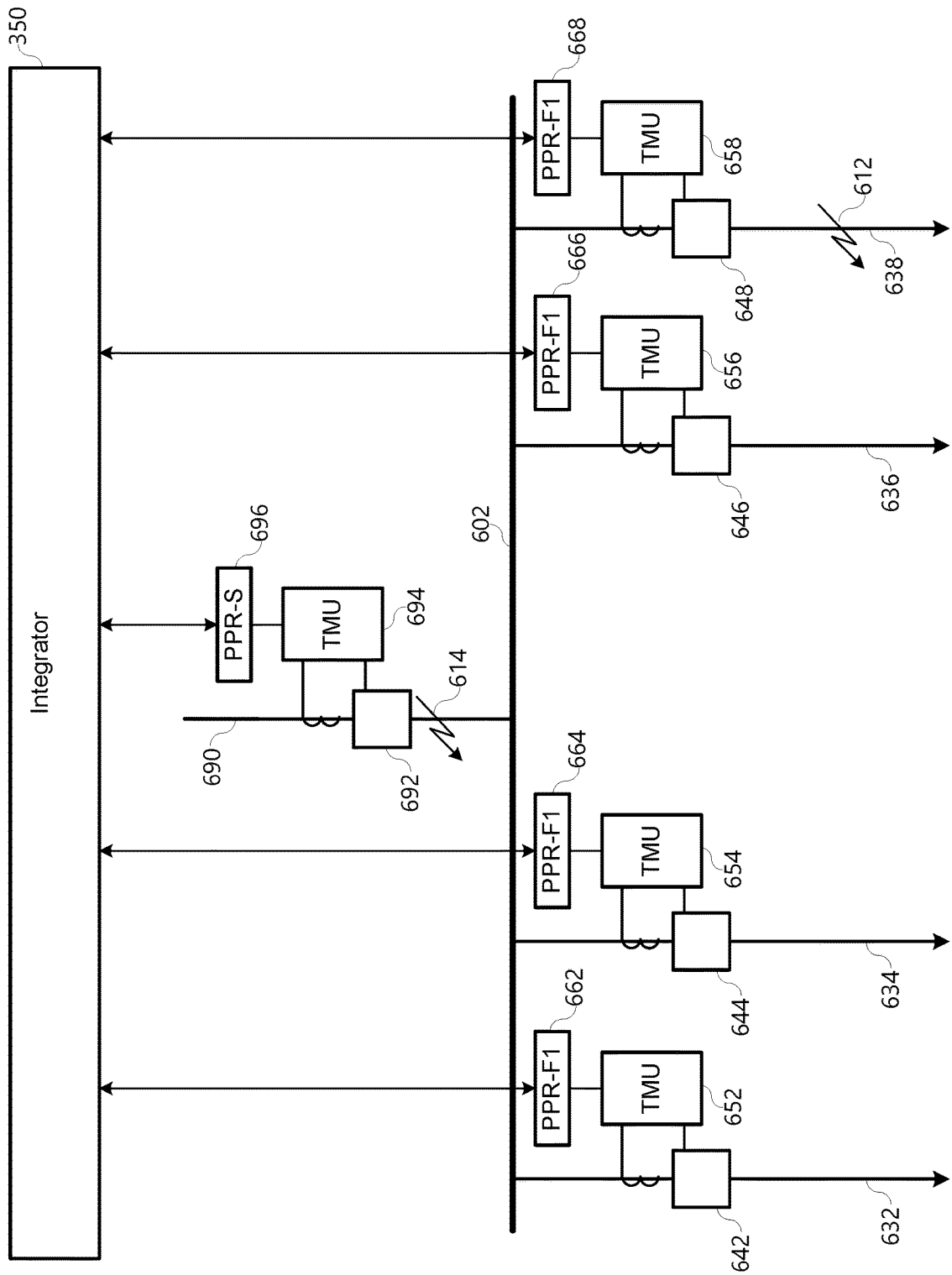
FIG. 6 illustrates a simplified one-line diagram of an electric power delivery system with associated primary and backup protection system.

In relation to the fast bus 516 protection, FIG. 6 illustrates a simplified one-line example of a power system protected in accordance with several embodiments described herein. The system includes a source line 690 with breaker 692, bus 602, and feeders 632, 634, 636, and 638 that include breakers 642, 644, 646, and 648. Each feeder is protected by a primary feeder protection relay 662, 664, 666, 668 that obtain signals and signal breakers using merging units 652, 654, 656, and 658. Source is protected using primary source protection relay 696 that obtains signals and controls breaker 692 via merging unit 694. An integrator 350 in accordance with the several embodiments herein obtains signals and other communications from the various primary protection relays, and sends commands and other communications to the various primary protection relays.

A fault 614 on the source line is only detected by the primary source protection relay 696 due to an overcurrent detection. Proper primary protection for this fault is for the primary source protection relay to open breaker 692 upon detection of the overcurrent condition. In another example, a fault 612 is detected by both the primary feeder protection relay 668 by an overcurrent on feeder 638, and by the primary source protection relay 696 by an overcurrent through the source, to the bus, to feeder 638 to the fault 612. Proper primary protection for fault 612 is to open breaker 648 and not open breaker 692, even though both relays 668 and 696 detected the fault. This removes power from only one feeder 638 instead of from all four feeders. Such coordination may be accomplished by coordinating action of the primary source protection relay 696 and the feeder protection relays 668. This coordination may be performed in the integrator 350.

Figure 7:
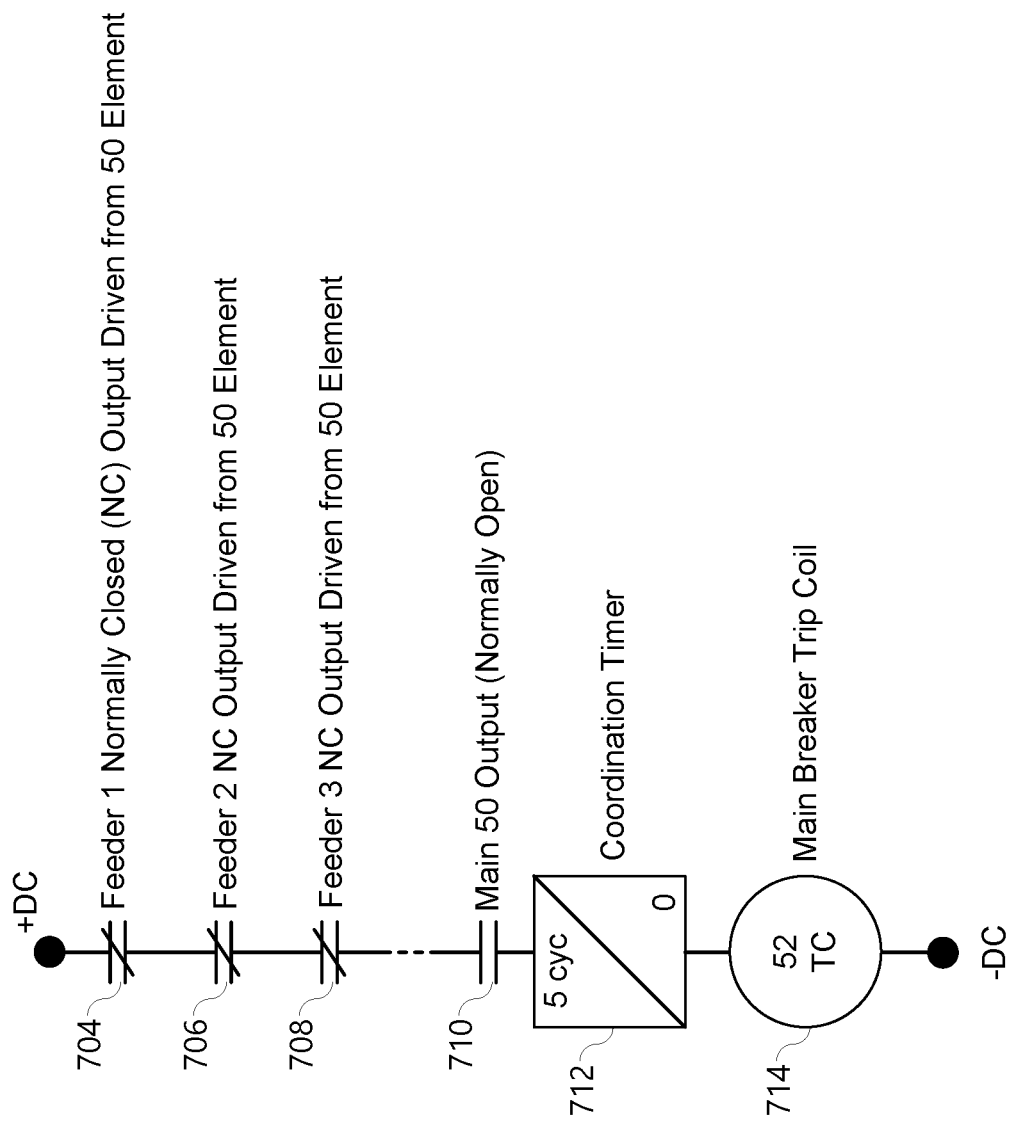
FIG. 7 illustrates a simplified protection element diagram for an electric power delivery system.

FIG. 7 illustrates an example of a contact output arrangement that may be logically applied by the fast bus application 516 of the integrator 350. The contact output arrangement for the primary source protection relay 696 may include normally closed contacts 704, 706, 708 for the feeder relays, a normally open contact 710 for the primary source protection relay 696, and a timer 712 for instigating a signal to the breaker trip coil (or signal the merging unit 694 to open the source breaker 692). If no feeder detects an overcurrent condition (e.g. fault 614 on source), contacts 704, 706, and 708 remain closed, and contact 710 closes upon detection of the overcurrent condition. A short (5 cycle as illustrated) coordination timer 712 is initiated providing time for the feeder protection relays to detect and signal a fault by opening the associated contacts 704, 706, 708. If none of the feeder protection relay contacts open, then the trip signal is sent to the source merging unit 694 (via the primary source protection relay 696) to open breaker 692. However, if a primary feeder protection relay detects a fault, such as relay 668 detecting fault 612, then the signal is sent to the integrator 350, and the associated logical contact 704 is opened such that no signal is sent to open the source breaker 692. Accordingly, fast bus protection is implemented using an integrator without communications or wiring trip contacts between multiple primary protection relays in a protection system.

Figure 8:
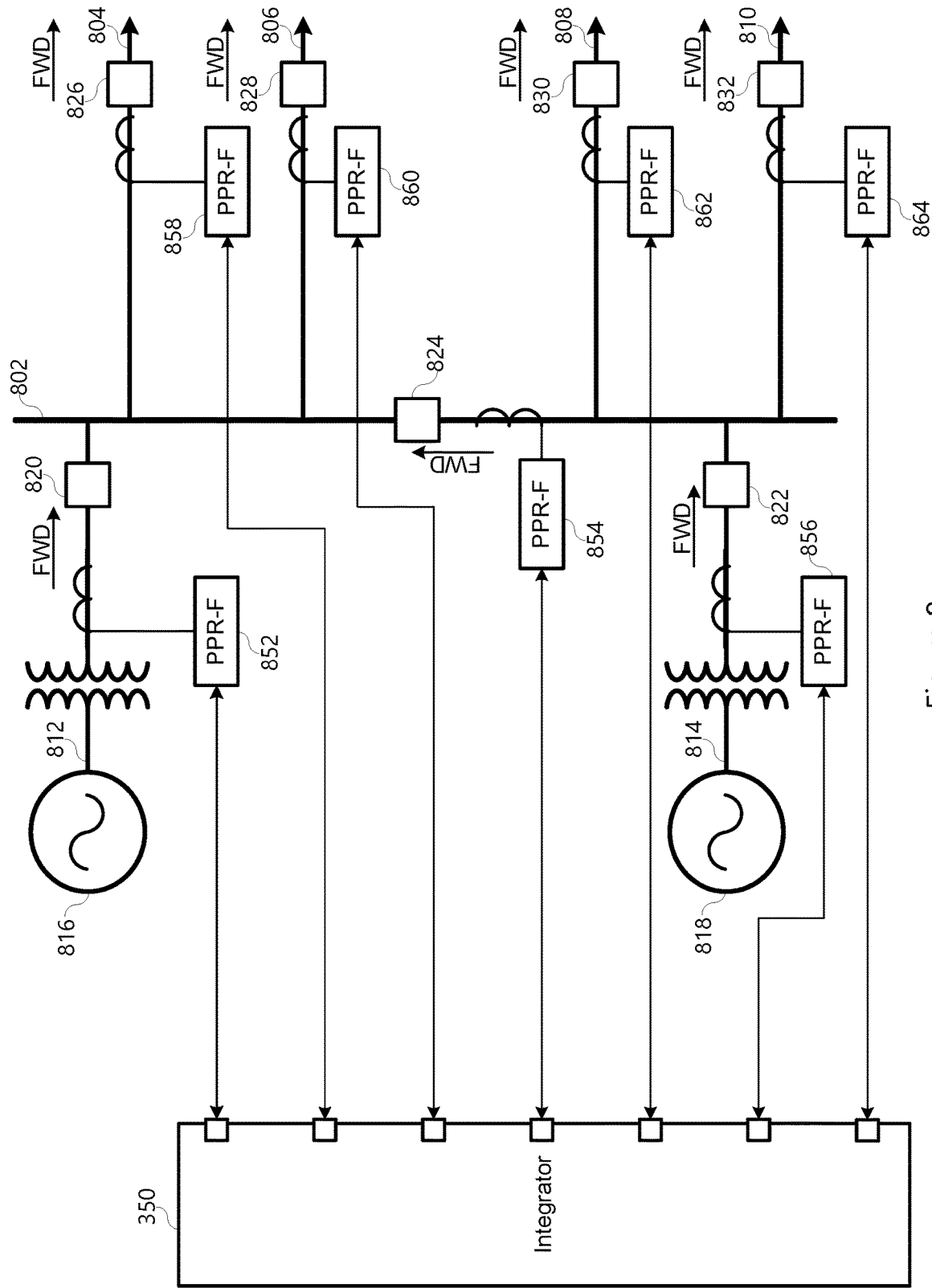
FIG. 8 illustrates a simplified one-line diagram of an electric power delivery system with associated primary and backup protection system.

FIG. 8 illustrates a simplified one-line diagram of a portion of an electric power distribution system in a looped-feeder configuration, that includes an integrator 350 for secondary applications. It should be noted that the simplified diagram does not specifically illustrate source or transformer protection, which would likely be included in a complete protection system for such a distribution system. The distribution system includes two sources 816, 818 providing electric power to loads on feeders 804, 806, 808, and 810 via bus 802. The bus 802 is selectively connected using breaker 824. It should be noted that the illustrated protection system does not include merging units for simplicity, however merging units may be used to sample and provide digitized analog signals to the primary protection relays, as well as provide status and commands to equipment such as circuit breakers. Primary protection relays 852, 854, 856, 858, 860, 862, and 864 may be used to provide primary protection to the sources, bus, and feeders. It should be noted that the primary protection relays 852-864 are all labeled as primary feeder protection relays, but may be configured as other types of primary protection relays.

The integrator 350 may be in communication with the primary protection relays 852-864 and configured to provide several secondary applications including, for example, bus protection, sectionalization, breaker failure protection, remote breaker control, local breaker control, and status indication for the non-radial power system. Each feeder shown may be looped or have a remote source.

The primary protection relays 852-864 may be associated with the breakers 820, 822, 824, 826, 828, 830, and 832. The primary protection relays 852-864 may include directional elements that operate in both forward and reverse directions. Directional elements of the primary protection relays may determine the direction to the fault. FIG. 8 illustrates the relative forward direction. In addition to protecting the associated line, each primary protection relay transmits the status of its directional overcurrent elements to the integrator 350. The integrator may combine directional decisions and send signals to trip the appropriate breakers in the event of a bus fault (fast bus application 516 and/or bus backup application 518) or a failed breaker (breaker failure application 538).

The integrator 350 may declare a bus fault if any of the primary protection relays detects a fault in the direction of a bus section and no relay connected to that section detects a fault in the direction away from the bus. This logic recognizes that a remote breaker might be open, or a line might be radial, eliminating any directional decision from the line relay. When the integrator 350 detects a bus fault, it issues trip commands to each relay on the faulted bus section. The integrator 350 allows any relay to be taken out of service with the associated breaker open without impacting bus protection. Should any relay fail without being taken out of service, or in the event a relay loses a potential transformer connection (directly or via an associated merging unit), the integrator 350 disables bus protection, and sends a signal to all relays on the affected bus section. The relays then revert to coordinated time overcurrent protection to protect the bus and breakers.

In some embodiments, the secondary applications 580 of integrator 305 may include cable differential protection 540. The cable differential 540 may obtain current signals at two points on any protected zone, such as two ends of a power cable, and apply differential protection to the zone. The cable differential protection 540 may compare the currents (re-sampled and time aligned) at each point on the protected zone. The current differential may be segregated phase or composite. Symmetrical components of the current signals may be used. Upon detection of a current differential, the integrator 305 may signal to open circuit breakers to isolate the faulted section. In some embodiment, the protected zone may be an underground portion of an electrical line. In some embodiments, the protected zone may be a section of line between two buses.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. An integrator device for protection of an electric power delivery system, the integrator device comprising:
    a first input for receiving electric power delivery system signals and primary protection status from a first primary protection relay protecting a first portion of the electric power delivery system;
    a processor;
    a computer-readable storage medium that comprises computer instructions that when executed cause the integrator device to:
        determine an electric power delivery system condition using the electric power delivery system signals and primary protection status from the first primary protection relay, wherein the primary protection status comprises an open signal for a first circuit breaker of the first portion of the electric power delivery system;
        compare the electric power delivery system condition with a predetermined threshold;
        when the electric power delivery system condition is outside of the threshold, determine a backup protection function for the first primary protection relay, wherein the backup protection function comprises an open signal for a second circuit breaker; and,
        issue a backup protection command to a second primary protection relay protecting a second portion of the electric power delivery system, the backup protection command to open the second circuit breaker of the second portion of the electric power delivery system, the backup protection command corresponding with the determined backup protection function for operation by the electric power delivery system to affect the first portion and the second portion of the electric power delivery system.

2. The integrator device of claim 1, further comprising a second input for receiving electric power delivery system signals and primary protection status from a second primary protection relay.

3. The integrator device of claim 1, wherein the backup protection command comprises a redundant backup protection command.

4. The integrator device of claim 1, wherein the backup protection command comprises a time delay to allow the primary protection relay to take a protective action prior to execution of the backup protection function.

5. The integrator device of claim 1, wherein the backup protection function comprises a bus backup protection function.

6. The integrator device of claim 1, wherein the backup protection function comprises a feeder backup application.

7. The integrator device of claim 1, wherein the backup protection function comprises a transformer backup application.

8. The integrator device of claim 1, wherein the backup protection function comprises a breaker failure application, and the command comprises opening a specified breaker of the electric power delivery system to remove power from a faulted feeder that includes a failed breaker.

9. The integrator device of claim 1, wherein the computer instructions further cause the integrator device to:
    resample and time align the electric power delivery system signals from the first primary protection relay and a second primary protection relay, and
    use the resampled and time aligned electric power delivery system signals in determining the electric power system condition.

10. The integrator device of claim 1, wherein:
    the backup protection command is issued upon persistence of the determined electric power delivery system condition outside of the threshold.

11. The integrator device of claim 10, wherein the backup protection command is issued after a time delay and persistence of the determined electric power delivery system condition outside of the threshold.

* * * * *